United States Patent [19]

Gerritsen, Jr.

[11] Patent Number: 5,421,091
[45] Date of Patent: Jun. 6, 1995

[54] ADJUSTABLE GUIDE SHOE FOR RECIPROCATING SAW

[75] Inventor: John T. Gerritsen, Jr., Elgin, Ill.

[73] Assignee: S-B Power Tool Company, Chicago, Ill.

[21] Appl. No.: 200,384

[22] Filed: Feb. 23, 1994

[51] Int. Cl.6 ............................................. B23D 49/16
[52] U.S. Cl. ......................................... 30/377; 30/392
[58] Field of Search ................. 30/377, 374, 375, 392, 30/393; 403/325

[56] References Cited

U.S. PATENT DOCUMENTS

| | | | |
|---|---|---|---|
| 3,155,011 | 11/1964 | Hyskell | 30/392 X |
| 4,545,121 | 10/1985 | Armbruster et al. | 30/377 X |
| 5,007,172 | 4/1991 | Palm | 30/377 |
| 5,134,777 | 8/1992 | Meyer et al. | 30/393 X |
| 5,212,887 | 5/1993 | Farmerie | 30/393 X |

Primary Examiner—Rinaldi I. Rada
Attorney, Agent, or Firm—Jones, Day, Reavis & Pogue

[57] ABSTRACT

The adjustable guide shoe is mounted on a support bar which is received within an elongated slot formed in the nose section of the power saw. The support bar is provided with plural sets of opposed cam faces which are provided in side-by-side pairs spaced longitudinally of the bar. A manually operated plunger is mounted in the nose section and is spring biased toward the support bar. The plunger bar includes cam surfaces adapted for complimentary wedging engagement with selected sets of cam faces on the support bar to achieve a self-locating function for the support and guide shoe mounted thereon.

7 Claims, 3 Drawing Sheets

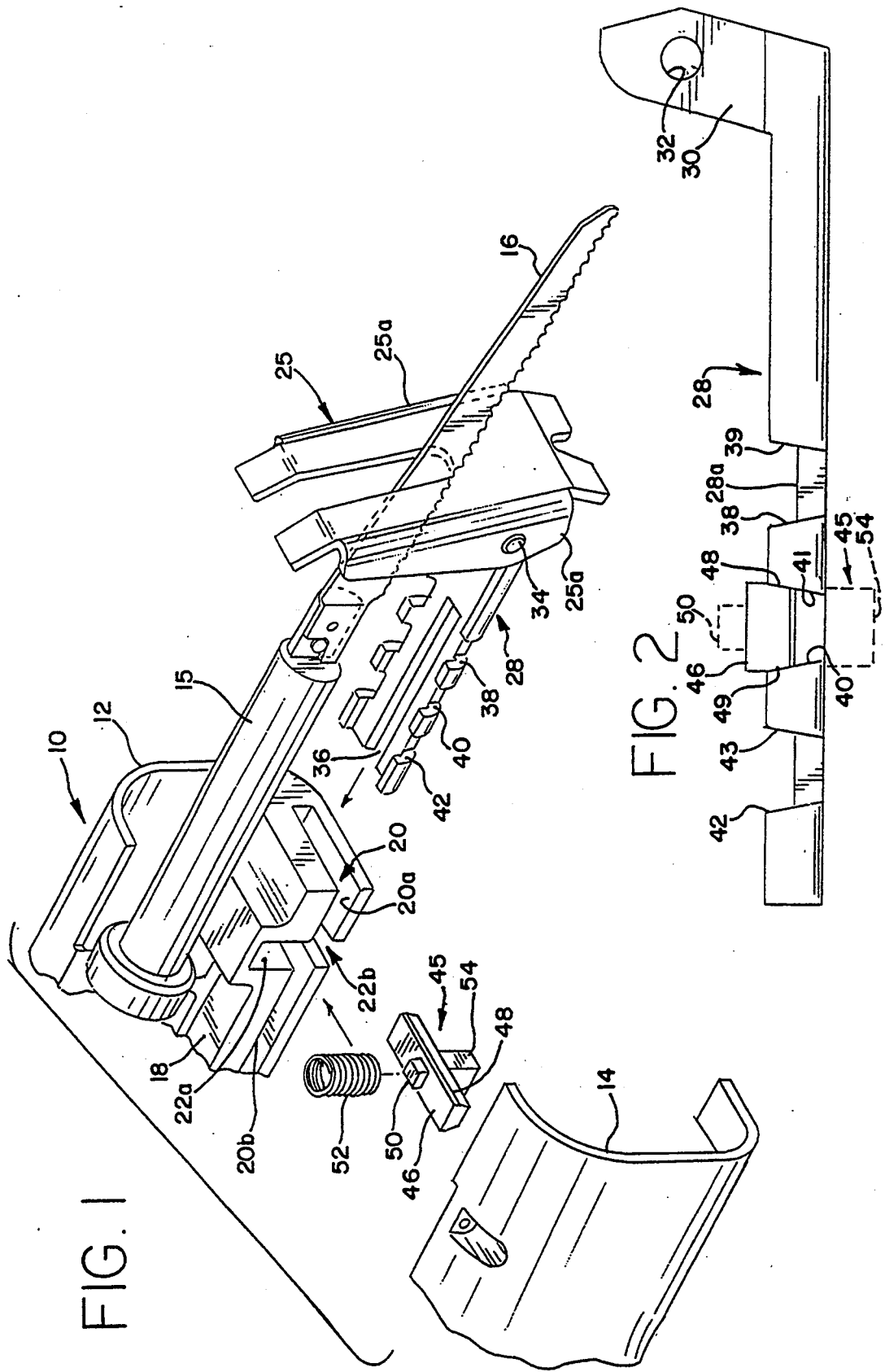

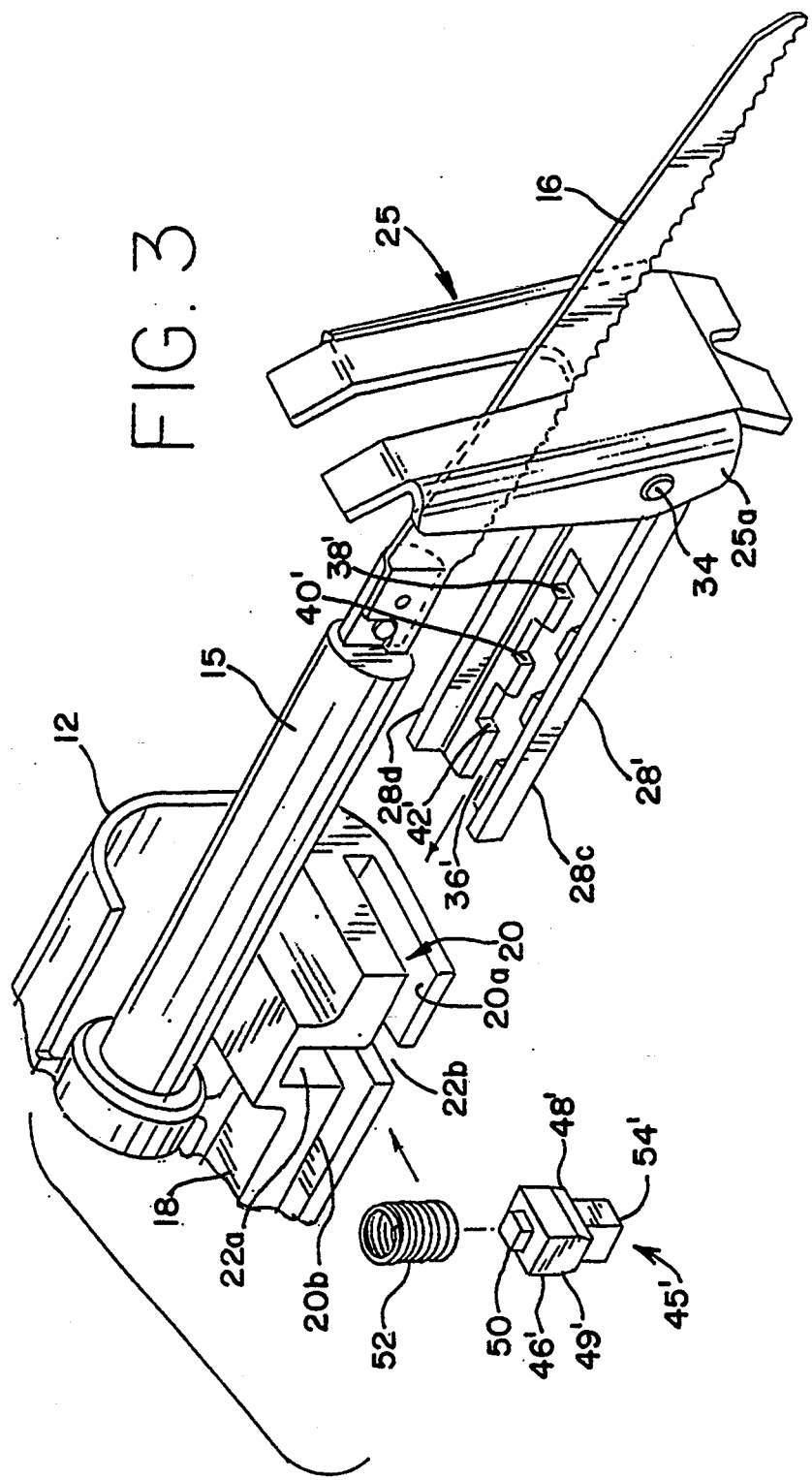

ADJUSTABLE GUIDE SHOE FOR RECIPROCATING SAW

The present invention relates to a power tool having a reciprocating, and sometimes oscillating, saw blade holder. More particularly, the present invention relates to an adjustable guide shoe for such a power tool.

BACKGROUND OF THE INVENTION

Reciprocating saws are provided with a shoe which permits the operator to position the saw relative to the work being cut. As is known to those who are experienced in using such tools, for a particular application there is an optimum position for the shoe. Adjustment of the shoe makes plunge and pocket cuts easier and extends the blade life by cutting with different areas of the blade.

A typical shoe support is secured into position with adjusting screws. These screws pass through slots in the shoe support and thread into the front end of the gear housing clamping the support and shoe in the desired position. Adjustment of the shoe position requires the use of a separate tool, such as a screwdriver. This adjustment procedure is often not performed by the operator because the procedure consumes appreciable time and is cumbersome. Moreover, the separate tool necessary to loosen or tighten the screws is, more often than not, lost or misplaced. Consequently, optimum positioning of the shoe for a given application may often not be achieved.

Another form of guide shoe adjustment mechanism is shown in U.S. Pat. No. 5,007,172, which issued on Apr. 16, 1991 to Bernard Palm. According to the disclosure in that patent, adjustment is accomplished by rotating a lever. Attached to this lever is a lock pin which is pivotally mounted in the front end of the gear housing transverse to the shoe support. The pin's geometry comprises a "D" shaped formation having the rounded portion thereof adapted for engagement in a selected one of three arcuate grooves formed in the support to secure the support, and hence the shoe, into the desired position. To release and reposition the shoe, the lever is rotated allowing the flat portion of the pin to be parallel with the flat portion of the support thereby providing clearance which permits the support and shoe to move freely. When the shoe has been moved to its desired position, the lever is rotated back enabling the rounded portion of the pin to engage and be received in the selected arcuate groove in the support thereby to establish the new position for the shoe.

There are several disadvantages with the mechanism disclosed in U.S. Pat. No. 5,007,172. First, when the actuating lever is in the "lock" position, friction must be relied upon to hold the lever in place. The amount of friction available diminishes with usage over time because of wear. When the friction diminishes the support gains freedom of movement, appearing loose or insecure, thereby increasing the chances of having a locking pin becoming mistakenly disengaged due to looseness. Secondly, the particular design under discussion does not incorporate a self-locating action for the locking pin to align itself with the arcuate grooves in the support. The operator must jiggle the support to "feel" the position wherein the rounded portion of the pin will be received in one of the arcuate recesses in the support. Third, the shoe support according to this prior art design is in the form of a post with flats and grooves and is thus expensive to manufacture.

SUMMARY OF THE INVENTION

The present invention provides a guide shoe mechanism for a power tool which does not require a separate tool for adjustment purposes and which incorporates a self-positioning and self-locking feature. Further, the mechanism of the present invention can be readily and inexpensively manufactured and incorporated in the housing of a power reciprocating saw.

DESCRIPTION OF THE DRAWINGS

FIG. 1 is an exploded isometric view of one embodiment of the present invention;

FIG. 2 is an enlarged side view of the support bar and the actuating plunger;

FIG. 3 is an exploded isometric view of a modified version of the invention.

DESCRIPTION OF THE INVENTION

Figure 4:
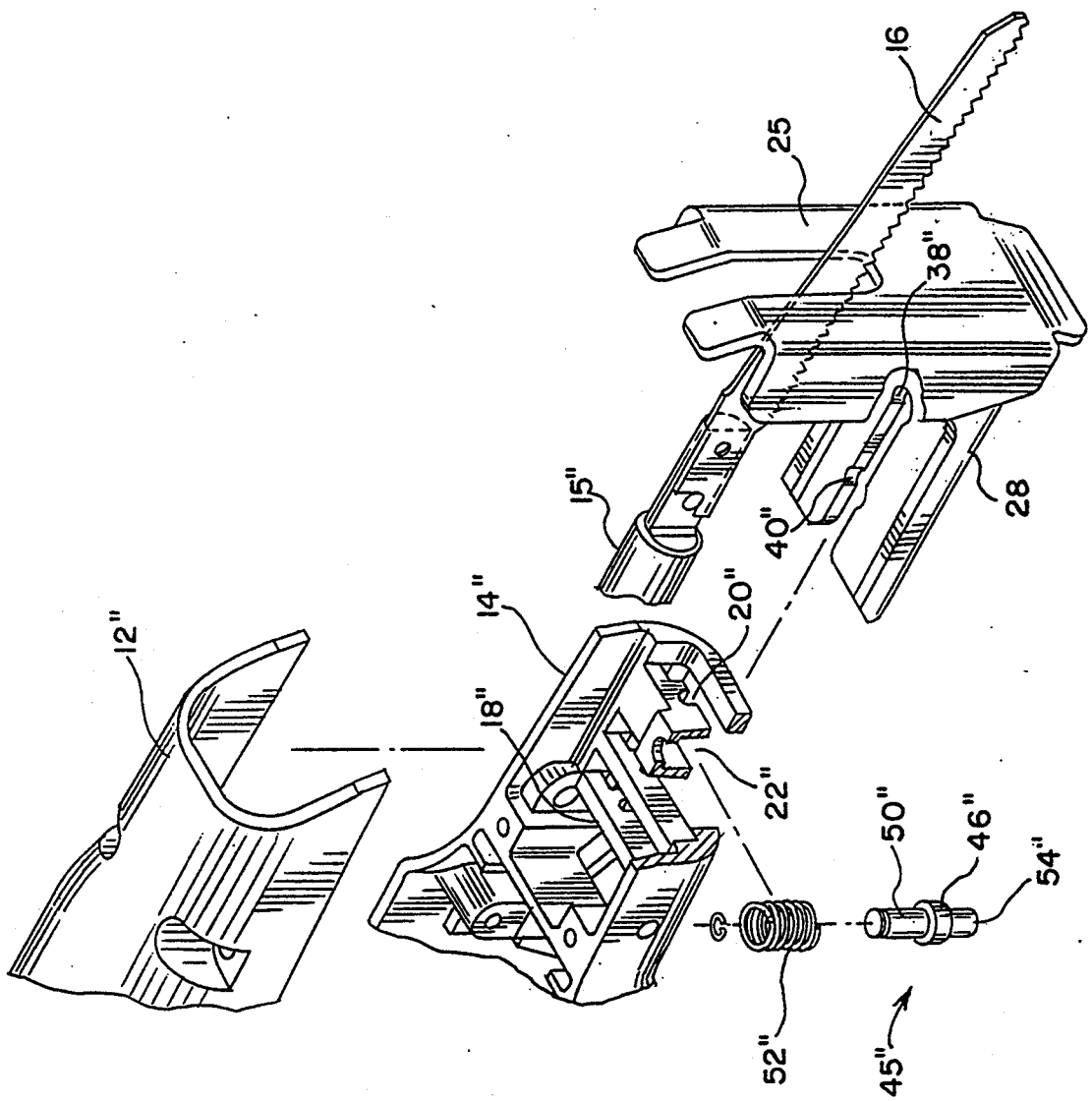
FIG. 4 is an exploded isometric view of a further modified version of the invention.

Referring to FIG. 1, a power tool in the form of a reciprocating saw is generally designated 10. The tool includes a housing having clam shell sections 12 and 14. The tool suitably mounts a cylindrical blade holder 15 for reciprocating movement. The blade holder mounts a saw blade 16. Of course, the power tool includes a motor, normally an electric motor, which drives a suitable gear mechanism and transmission to impart reciprocating movement to the blade holder 15. The tool may also be provided with mechanism to provide an orbital movement to the saw blade 16.

The housing shell 12 includes an internal wall formation 18 which cooperates with the lower portion of the shell 12 to define a slot 20. The slot includes a flat or planar lower surface 20a and an upper planar surface 20b. It is noted that these planar surfaces are interrupted by an upper aperture 22a and a lower aperture 22b. The clam shell section 14 includes housing formations (not shown) which are partially received within the slot 20 and the apertures 22a and 22b when the clam shell sections 12 and 14 are mounted together. When the housing shell sections are mounted together, the slot 20 is rectangular in cross section, elongated in the direction of reciprocation of the blade holder 15, and opens at the front of the nose portion of the power tool. It will be understood that the slot 20 extends longitudinally of the tool housing in parallel spaced relationship with the reciprocal plunger 15. When the housing shell sections are secured together, the aperture 22b will be in the form of a small rectangular opening in the bottom surface of the housing shell 12 for accommodating the actuator of a plunger to be described below.

The adjustable shoe 25 is essentially of conventional construction including side flanges 25a. The shoe 25 is mounted to a support bar 28 for pivoting movement relative thereto. In this regard, the support 28 is provided with a pair of identical ears, one such ear being shown in FIG. 2 as 30. The ear 30 includes an aperture 32 receiving a pin 34. It is understood of course that a pair of the pins 34 is provided for respective engagement with the ears 30.

The support bar 28 is generally in the form of an elongated bar having a central aperture 36. The bar 28 is notched so as to provide plural sets of opposed cam faces 38 and 39, 40 and 41, and 42 and 43 along each side edge of the support bar. Referring to FIG. 2, it is noted that the opposed cam faces of each set of cams are symmetrically disposed with respect to a plane located equidistantly between the cam faces and perpendicular to the support bar 28. That is to say, each cam face, such as the cam face 38, has the same angle of inclination, from the imaginary plane just mentioned, as its opposed cam face, such as the cam face 39.

The present invention also includes a plunger, generally designated 45, which includes a body portion 46. The body portion is provided with opposed cam surfaces 48, 49. The cam surfaces 48 and 49 are symmetrically inclined with respect to a plane which passes centrally of the plunger 45 and is perpendicular to the direction of movement of the support bar 28.

The plunger 45 further includes a stub formation 50 adapted to be received within one end of a coil spring 52, the latter being captured within the aperture 22a when the clam shell housing sections are secured together. The coil spring 52 acts to urge the plunger 45 downwardly and toward the support bar 28. The plunger 45 also includes an actuating button 54 which extends through the aperture 22b and projects slightly below the lower surface of the housing shell 12.

Referring to FIG. 2, it is seen that the opposed planar faces of each set of cam faces, such as the faces 40 and 41, diverge upwardly. The cam surfaces of the plunger 45 are of complimentary configuration in that the cam surfaces 48 and 49 converge downwardly thus affording a wedging action between the plunger 45 and the selected side-by-side sets of opposed cam faces. As noted in FIG. 2, a space is provided between the lower surfaces of the bar 46 of the plunger and the upper surface 28a of the support bar. Thus, the plunger 45, under the influence of the spring 52, may be wedged into secure engagement with the support bar.

In use, the operator will engage the actuator 54 of the plunger 45 with one of his or her fingers thus raising the plunger bar 46 such that it is out of the path of movement of the upper extremities of the cam faces on the support bar 28. The operator then manipulates the support bar manually such that selective sets of cam faces are positioned generally adjacent the bar 46 of the plunger 45. The operator then may release the plunger thus permitting the spring 52 to urge the bar 46 toward the support bar 38. The operator may then jiggle the support bar in either direction for fine positioning of the same until the plunger bar 46 snaps into engagement with selected sets of the cam faces under the influence of the spring 52. When it is desired to insert or remove the support 28 and foot 25, it is only necessary to depress the plunger portion 54 and hold the same while grasping the support bar or shoe for removal or installation.

Referring now to FIG. 3 which shows a slightly modified form of the present invention, the parts which are the same as the parts of the embodiment of FIGS. 1 and 2 are indicated by the same numerals; the parts which are modified are indicated by the prime form of numeral.

According to the embodiment of FIG. 3, the support bar 28 is notched somewhat differently to provide the various sets of cam faces, including the faces 38', 40' and 42'. To accommodate for this change in the configuration of the support bar, the body portion 46' of the plunger 45' is shortened so as to clear the side rails 28c and 28d of the support bar. The embodiment of FIG. 3 operates in the same manner as the embodiment of FIGS. 1 and 2 as the plunger cam surfaces 48' and 49' will be snugly engaged in a wedging manner with the sets of opposed planar cam faces extending along each side of slot 36' in the support bar 28'.

Referring to FIG. 4 which shows another modified form of the present invention, the parts which are the same as the embodiment of FIGS. 1 and 2 are indicated by the same numerals; the parts which are modified are indicated by the double prime form of numeral.

According to this embodiment, the tool housing is constituted by upper and lower clam shell sections 12" and 14", respectively. The lower section includes formations 18" defining the slot 20" for receipt of the support bar 28 which mounts the shoe 25. The lower housing shell includes formations defining an aperture 22" communicating with the slot 20".

The plunger 45" includes an upper cylindrical section 50" adapted to receive the coil spring 52". The plunger also includes a cam formation defined by the frusto-conical formation 46". When the plunger 45" and spring 52" are received within the aperture 22", the portion 54" of the plunger projects from the lower housing section 14" to permit manual actuation of the plunger.

The support bar 28 includes plural sets of cam faces 38" and 40". Each of these cam faces can be considered as a segment of an imaginary frusto-conical section which converges from top to bottom as seen in FIG. 4. Diametrically opposed segments of the frusto-conical formation 46" on the plunger will engage the opposed frusto-conical cam surfaces on the support bar to provide the wedging action for locating the shoe in its desired position.

Thus, it will be seen that the present invention provides a quick release adjustable shoe which is easy to operate and which does not require the use of special tools, such as a screwdriver or Allen wrench. The present invention allows for more efficient use of the saw blade and greater control over the depth of cut. The wedge-shaped cam surface on the plunger and support bar in conjunction with a positive bias by the compression spring provide a positive self-locating action in each one of the three side-by-side sets of opposed cam faces. Although the present invention discloses two or three positions for the support bar, it will be appreciated that the present invention embodies any desired number of positions for the support bar. The invention has further advantages in that the opening in the gear housing, where the mechanism is incorporated, can be cast and does not require secondary machining. Finally, the plunger may be made from a powdered metal material and both the supporting shoe may be made from ⅛ inch sheet material, all contributing to a low-cost adjustable shoe mechanism.

I claim:

1. A power saw having a housing including a nose section and comprising:
   a. a saw blade holder projecting from said nose section for reciprocating movement relative thereto;
   b. said nose section being provided with a slot in parallel spaced relationship with said blade holder and opening to the exterior of said nose section, said nose section also being provided with an aperture in communication with said slot;
   c. a support bar received within said slot for reciprocal sliding movement therein and having an outer end, said bar having plural sets of cam faces spaced longitudinally thereof;

d. a guide shoe pivotally mounted on the outer end of said support bar;
e. a plunger mounted in said aperture for movement along a path generally perpendicular to the path of movement of said support bar;
f. biasing means urging said plunger into engagement with said support bar; and
g. said plunger having cam surfaces adapted for respective engagement with the cam faces of a selected one of said sets of cam faces in response to fine positioning of the support bar relative to the plunger.

2. The power saw according to claim 1 wherein said cam faces are inclined with respect to a plane containing said support bar and wherein said cam surfaces are also inclined in complimentary relationship with said cam faces on the support bar to provide a wedging action between the latter and said plunger.

3. The power tool according to claim 2 wherein said cam faces on the support bar are defined by segments of an imaginary frusto-conical section and wherein said cam faces are defined by segments of a frusto-conical formation on said plunger.

4. The power saw according to claim 1 further defined by:
a. each set of cam faces comprising a pair of opposed planar formations symmetrically inclined with respect to a plane located between said planar formations and perpendicular to the path of movement of said support bar.

5. The power tool according to claim 3 wherein said aperture has a portion opening to the exterior of said nose section and wherein said plunger includes an actuating formation disposed exteriorly of the saw housing through said aperture portion to facilitate manual actuation of the plunger.

6. The power saw according to claim 1 wherein said aperture has a portion opening to the exterior of said nose section and wherein said plunger includes an actuating formation disposed exteriorly of the saw housing through said aperture portion to facilitate manual actuation of the plunger.

7. The power tool according to claim 1 wherein plural sets of opposed cam faces are provided in side-by-side pairs spaced longitudinally along the support bar.

* * * * *